(12) United States Patent
Inoh

(10) Patent No.: US 10,155,331 B2
(45) Date of Patent: Dec. 18, 2018

(54) METHOD OF PRODUCING FIBER-REINFORCED RESIN-MOLDED MEMBER, AND METHOD OF CONNECTING MEMBERS

(71) Applicant: TOYOTA JIDOSHA KABUSHIKI KAISHA, Toyota-shi, Aichi-ken (JP)

(72) Inventor: Takashi Inoh, Okazaki (JP)

(73) Assignee: TOYOTA JIDOSHA KABUSHIKI KAISHA, Toyota-shi, Aichi-ken (JP)

( * ) Notice: Subject to any disclaimer, the term of this patent is extended or adjusted under 35 U.S.C. 154(b) by 355 days.

(21) Appl. No.: 14/921,493

(22) Filed: Oct. 23, 2015

(65) Prior Publication Data
US 2016/0121554 A1 May 5, 2016

(30) Foreign Application Priority Data

Oct. 29, 2014 (JP) .................................. 2014-219930

(51) Int. Cl.
*B29C 45/56* (2006.01)
*B29C 45/14* (2006.01)
(Continued)

(52) U.S. Cl.
CPC ...... *B29C 45/561* (2013.01); *B29C 45/14786* (2013.01); *B29C 65/4815* (2013.01); *B29C 65/5057* (2013.01); *B29C 66/1122* (2013.01); *B29C 66/43* (2013.01); *B29C 66/721* (2013.01); *B29C 66/73921* (2013.01);
(Continued)

(58) Field of Classification Search
CPC .... B29C 2045/14122; B29C 45/14631; B29C 45/14786; B29C 45/36; B29C 45/363; B29C 45/14336; B29C 2043/3444; B29C 2043/3613; B29C 45/561; B29C 45/5675
See application file for complete search history.

(56) References Cited

U.S. PATENT DOCUMENTS 7,186,105 B2 *  3/2007  Cesano ................... B29C 35/02
                                                       425/112
8,021,589 B2 *  9/2011  Haimoff .............. B29C 37/0085
                                                       264/279
(Continued)

FOREIGN PATENT DOCUMENTS

CN          101043954 A      9/2007
DE          10258630 A1      7/2004
(Continued)

*Primary Examiner* — Atul P. Khare
(74) *Attorney, Agent, or Firm* — Sughrue Mion, PLLC

(57) ABSTRACT

A method of producing a fiber-reinforced resin-molded member includes: preparing a mold including an upper mold and a lower mold forming a cavity, a cavity surface of either the upper mold or the lower mold being provided with a projecting portion; disposing a fiber-reinforcing material in the cavity, closing the molds to generate a state in which the projecting portion presses a part of the fiber-reinforcing material, and filling the cavity with a melted resin to impregnate the fiber-reinforcing material with the melted resin and cure the melted resin; and opening the molds to obtain a fiber-reinforced resin-molded member having an exposed portion and an embedded portion. The exposed portion includes at least a portion pressed by the projecting portion while the molds are closed.

4 Claims, 6 Drawing Sheets

(51) Int. Cl.
*B29C 70/46* (2006.01)
*B29C 65/48* (2006.01)
*B29C 65/50* (2006.01)
*B29C 65/00* (2006.01)
*B29C 70/02* (2006.01)
*B29C 43/34* (2006.01)
*B29C 43/36* (2006.01)

(52) U.S. Cl.
CPC ............ *B29C 70/46* (2013.01); *B29C 66/126* (2013.01); *B29C 2043/3444* (2013.01); *B29C 2043/3613* (2013.01)

(56) References Cited

U.S. PATENT DOCUMENTS

| | | | | |
|---|---|---|---|---|
| 8,658,269 | B1 * | 2/2014 | Parkes | B29C 45/14786 428/156 |
| 9,216,361 | B2 * | 12/2015 | Jackson | A63H 9/00 |
| 2009/0068365 | A1 | 3/2009 | Obermeyer et al. | |
| 2013/0149483 | A1 | 6/2013 | Kruse et al. | |

FOREIGN PATENT DOCUMENTS

| | | | | |
|---|---|---|---|---|
| DE | 102008063651 A1 | 7/2010 | | |
| DE | 102011120636 A1 | 6/2013 | | |
| DE | 102014001128 A1 | 7/2015 | | |
| EP | 0517614 A1 * | 12/1992 | ................ | A47C 7/16 |
| EP | 1226923 A1 * | 7/2002 | ............ | B29C 33/123 |
| FR | 1170359 A * | 1/1959 | ............. | B29C 33/00 |
| FR | 3006231 A1 * | 12/2014 | ....... | B29C 45/14344 |
| JP | 59187816 A | 10/1984 | | |
| JP | 2001-252985 A | 9/2001 | | |
| JP | 2002-011795 A | 1/2002 | | |
| JP | 2011-079289 A | 4/2011 | | |
| JP | 2014172201 A | 9/2014 | | |
| JP | 2016055459 A | 4/2016 | | |
| WO | 2014/103658 A1 | 7/2014 | | |
| WO | 2014/125999 A1 | 8/2014 | | |

* cited by examiner

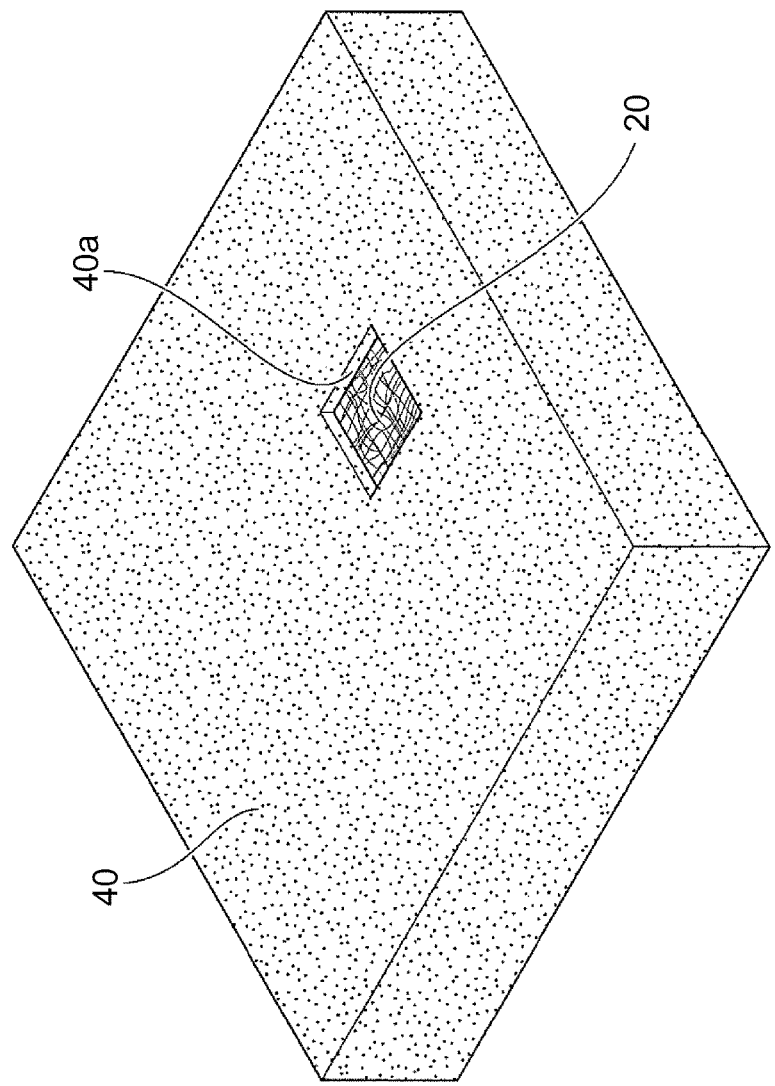

METHOD OF PRODUCING FIBER-REINFORCED RESIN-MOLDED MEMBER, AND METHOD OF CONNECTING MEMBERS

INCORPORATION BY REFERENCE

The disclosure of Japanese Patent Application No. 2014-219930 filed on Oct. 29, 2014 including the specification, drawings and abstract is incorporated herein by reference in its entirety.

BACKGROUND OF THE INVENTION

1. Field of the Invention

The present invention relates to a method of producing a fiber-reinforced resin-molded member to be connected to a different resin-molded member, and a method of connecting members using fiber-reinforced resin-molded members produced by the same producing method.

2. Description of Related Art

Fiber-reinforced resin members (fiber-reinforced plastics (FRP)) formed of resin and reinforcing fiber materials contained in the resin (fiber-reinforcing materials) are used in various industrial fields, such as an automotive industry, a construction industry, and an aviation industry because of light weight and high strength thereof. For example, in the automotive industry, for the purpose of attaining reduction in weight of vehicles while ensuring strength of vehicles so as to manufacture environment-friendly vehicles with an enhanced fuel-efficiency, the aforementioned fiber-reinforced resin members are applied to non-structural members where designing properties are required. The non-structural members include frame structural members of vehicles such as front side members, center cross members, pillars, lockers, and floors of the bodies, and door outer panels and hoods.

As a method of connecting fiber-reinforced resin members to each other, there is commonly employed a connecting method through adhesive, or a connecting method using connecting components, such as bolting, screwing, and self-pierce riveting, or a combination of these methods.

There are a variety of methods of connecting fiber-reinforced resin members to each other, but the aforementioned conventional methods have various problems.

Specifically, there are the following problems: the method of using adhesive requires some time to bond the members; and the method through bolting, screwing, or self-pierce riveting requires connecting components, thus manufacturing time becomes increased, or manufacturing cost associated with the connecting components becomes increased.

Particularly, in the case of connecting fiber-reinforced resin members having three-dimensionally complicated shapes to each other using connecting components, such as bolts, it is not easy to handle alignment between the fiber-reinforced resin members to be connected; thus it is likely to increase assembly procedures to connect the members to each other using the connecting components. In connection through adhesive or welding, it is difficult to apply adhesive to, or apply heat to the entire portions (overlaid portions) to be connected that are three-dimensionally complicated as uniformly as possible.

Japanese Patent Application Publication No. 2002-11795 discloses a method of joining fiber-reinforced plastic members configured such that carbon fiber materials are protruded from respective FRP members at a joint target portion of the FRP members, the FRP members are disposed to be opposite to each other at the joint target portion, projecting ends of the fiber materials are laid over each other, and a resin material is supplied into a region where the carbon fiber materials are laid over at the joint target portion, and is then cured. Japanese Patent Application Publication No. 2011-79289 discloses a method of joining fiber-reinforced plastic members configured such that at least a partial matrix in a surface of a portion to be bonded to a synthetic resin of a fiber-reinforced plastic substrate is removed through physical or chemical means so as to expose reinforcing fibers to the surface, and a plasticized second polymer material is formed in a space where the matrix is removed so as to permeate voids and rough portions among the exposed reinforcing fibers with the plasticized second polymer material, and then cure this plasticized polymer material, thereby attaining firm adhesion through mechanical bonding.

These documents provide description regarding removal of the formed polymer material through chemical means or physical means as a method of protruding the carbon fiber materials from the respective FRP members. For example, if the matrix resin is a thermoplastic resin, it may be considered to employ a method of protruding the carbon fiber materials by dissolving the matrix resin using an appropriate solvent, or a method of melting the FRP member through heating to partially remove the FRP member so as to protrude the carbon fiber materials. Meanwhile, if the matrix resin is a thermosetting resin, it may be considered to employ a method of thermally decomposing the FRP member using a laser beam so as to protrude the carbon fiber materials.

Even if any of the above methods is applied, it is not easy to expose the fiber-reinforcing material from the surface of the member. For example, in the method of using the solvent, it is difficult to treat only a desired region of the member because liquid is used, and it is also necessary to consider a problem of treatment of the solvent as well as operational environments. In the method of exposing the fiber-reinforcing material through heating, there are problems that partial heating is difficult, and it is difficult to preferably separate only melted resin because the melted resin has a high viscosity. In the method of thermally decomposing the resin using a laser beam, there is a problem that facility cost becomes increased, and a location of a production site is limited.

SUMMARY OF THE INVENTION

The present invention provides a method of producing a fiber-reinforced resin-molded member, and a method of connecting members produced by using the fiber-reinforced resin-molded members.

A first aspect of the present invention is a method of producing a fiber-reinforced resin-molded member. The method includes: preparing a mold including an upper mold and a lower mold by both of which a cavity is formed, a cavity surface of the upper mold or a cavity surface of the lower mold being provided with a projecting portion, and the cavity surface facing the cavity; disposing a fiber-reinforcing material in the cavity, closing the upper mold and the lower mold to generate a state in which the projecting portion presses a part of the fiber-reinforcing material, and filling the cavity with a melted resin to impregnate the fiber-reinforcing material with the melted resin and cure the melted resin that has permeated the fiber-reinforcing material; and opening the upper mold and the lower mold to obtain a fiber-reinforced resin-molded member. The fiber-reinforced resin-molded member has an exposed portion where the fiber-reinforcing material is exposed to an outside of the cured melted-resin, and a portion where the fiber-reinforcing material is embedded in the cured melted-resin. The exposed portion includes at least a portion pressed by the projecting portion while the upper mold and the lower mold are closed.

According to the method of producing the fiber-reinforced resin-molded member of the first aspect of the present invention, it is possible to produce, with high accuracy by an inexpensive method, a fiber-reinforced resin-molded member in which an exposed portion where an inner fiber-reinforcing material is exposed to the outside is formed at a desired position of the fiber-reinforced resin-molded member.

The "cavity surface of the upper mold or of the lower mold is provided with a projecting portion" means that any one or both of the upper mold and the lower mold are provided with at least one projecting portion. It may be configured to set a position, a plane shape, and a plane dimension of the projecting portion, and/or the number of the projecting portions depending on the position of a connected portion or the number of connected portions at which the fiber-reinforced resin-molded member to be molded and a different resin-molded member are connected to each other.

The projecting portion may be integrated with the cavity surface of the upper old or the lower mold in a manner as to project into the cavity space.

In the aspect of the present invention, the projecting portion may include a core disposed on the cavity surface of the upper mold or the cavity surface of the lower mold.

In the above configuration, the core independent from the upper mold or the lower mold may be used, and this core may simply be disposed on a desired position of the cavity surface in an non-bonded state. Alternatively, the core may be bonded to be disposed on the cavity surface.

In the first aspect of the present invention, the fiber-reinforcing material may include a continuous-fiber-reinforcing material, a long-fiber-reinforcing material, or a short fiber-reinforcing material. The continuous-fiber-reinforcing material is a fiber material whose fiber length is more than 50 mm, as specified by the Japanese Industrial Standards (JIS), which is collected into a predetermined shape (e.g., three-dimensional shape approximate to the shape of a fiber-reinforced resin-molded body to be molded). The long-fiber-reinforcing material is a fiber-reinforcing material having a fiber length shorter than that of the continuous-fiber-reinforcing material, specifically, a fiber length within a range of less than 50 mm to more than 10 mm, which is collected into a predetermined shape. The short fiber-reinforcing material is a fiber-reinforcing material having a fiber length of 10 mm or less. An example of these fiber-reinforcing materials may include one of carbon fibers, metallic fibers, and ceramic fibers, or a mixture of two or more of them.

In the first aspect of the present invention, the fiber-reinforcing material is disposed in the cavity of the mold, and the mold is then closed. When the mold comes into this mold-closing posture, a state in which the fiber-reinforcing material is pressed at the predetermined portion by the projecting portion is generated. For example, if the cavity surface of the upper mold is provided with two projecting portions, the fiber-reinforcing material is pressed at two positions by the two projecting portions. If the projecting portion is provided to both the upper and lower molds, the upper and lower surfaces of the fiber-reinforcing material are pressed by the corresponding projecting portions. While the fiber-reinforcing material is pressed at the predetermined position by the projecting portion in the above manner, the cavity is filled with the melted resin such that the melted resin permeates the fiber-reinforcing material to spread across the entire cavity.

In the first aspect of the present invention, "filling the cavity with a melted resin" may be carried out through injection molding or extrusion molding of the melted resin.

The resin to be used in the first aspect of the present invention may be any of a thermoplastic resin and a thermosetting resin; the thermoplastic resin may be a crystalline plastic such as polyamide (PA) and polypropylene (PP), or an amorphous plastic such as polystyrene (PS) and polyvinyl chloride (PVC); and the thermosetting resin may be an epoxy resin or the like.

The melted resin supplied in the cavity permeates the fiber-reinforcing material, but hardly permeates the portion directly pressed by the projecting portion and peripheral portions thereof (portions that are not directly pressed but deformed due to influence from the directly pressed portion) because these portions are compressively deformed.

The melted resin thus permeates the other portions of the fiber-reinforcing material than the portion pressed by the projecting portion and the peripheral portions thereof, and the melted resin spreads across the entire cavity in a manner as to surround the fiber-reinforcing material, and finally to be cured.

In the first aspect of the present invention, the mold is opened, and the produced fiber-reinforced resin-molded member is released from the mold. In the fiber-reinforced resin-molded member released from the mold, there is formed a portion that no melted resin permeates because the portion is pressed, and compressively deformed by the projecting portion. Such a portion that no melted resin permeates becomes the exposed portion where the fiber-reinforcing material in the cured resin is exposed to the outside. At this exposed portion, the fiber-reinforced resin-molded member is connected to the predetermined resin molded-member, thereby forming the connected portion in a manner as to contain the fiber-reinforcing material located at the exposed portion. Accordingly, it is possible to connect the two members with high connecting strength.

A second aspect of the present invention is a method of connecting members. The method includes: disposing a first exposed portion of a first fiber-reinforced resin-molded member to be opposite to a second exposed portion of a second fiber-reinforced resin-molded member, the first fiber-reinforced resin-molded member and the second fiber-reinforced resin-molded member being produced by the method according to the first aspect of the present invention; and connecting the first fiber-reinforced resin-molded member and the second fiber-reinforced resin-molded member to each other by curing a melted resin disposed at least between the first exposed portion and the second exposed portion to connect at least the first exposed portion and the second exposed portion to each other.

In the second aspect of the present invention, while a resin block (solid body) is held between the first exposed portion and the second exposed portion, the resin block may be heated and melted such that the melted resin of the resin block is flown into between the first exposed portion and the second exposed portion.

In the second aspect of the present invention, while the first exposed portion and the second exposed portion are disposed to be opposite to each other, a previously melted resin may be flown into an interface between the first fiber-reinforced resin-molded member and the second fiber-reinforced resin-molded member, containing the first exposed portion and the second exposed portion.

In the second aspect of the present invention, there may be prepared a third fiber-reinforced resin-molded member. Furthermore, the upper and lower surfaces of the first fiber-reinforced resin-molded member may be provided with the respective first exposed portions. Then, a second exposed portion of the second fiber-reinforced resin-molded member and a third exposed portion of the third fiber-reinforced resin-molded member may be disposed respectively on the first exposed portion of the upper surface and the first exposed portion of the lower surface, the first exposed portion and the second exposed portion may be connected to each other, and the first exposed portion and the third exposed portion may also be connected to each other by curing the melted resin, thereby connecting the first fiber-reinforced resin-molded member, the second fiber-reinforced resin-molded member, and the third fiber-reinforced resin-molded member to each other.

A third aspect of the present invention is a method of connecting members. The method includes: disposing the exposed portion of the fiber-reinforced resin-molded member to be opposite to a predetermined resin-molded member, the fiber-reinforced resin-molded member being produced by the method according to the first aspect of the present invention; heating and melting a resin of an opposite portion of the predetermined resin-molded member that is opposite to the exposed portion; impregnating the exposed portion with the melted resin of the opposite portion; and curing the melted resin of the opposite portion, which melted resin has permeated the exposed portion, to connect the fiber-reinforced resin-molded member and the predetermined resin-molded member to each other.

In the connecting method of the third aspect of the present invention, one of the two members to be connected to each other may be the fiber-reinforced resin-molded member provided with the exposed portion produced by the producing method of the first aspect of the present invention, and the other member may be a resin-molded member provided with no exposed portion.

The "predetermined resin-molded member" may include a fiber-reinforced resin-molded member including a fiber-reinforcing material (but including no exposed potion), a resin-molded member including no exposed portion or no fiber-reinforcing material, and the like.

According to the third aspect of the present invention, the opposite portion (and the periphery thereof) of the predetermined resin-molded member, which is opposite to the exposed portion, is heated, and the melted resin of the opposite portion permeates the exposed portion, and the melted resin becomes cured, thereby connecting the fiber-reinforced resin-molded member and the predetermined resin-molded member.

According to the second aspect and the third aspect of the present invention, it is unnecessary to use connecting components such as adhesive and bolts. Thus, at least two resin-molded members can be efficiently connected to each other without increasing manufacturing cost. This is achieved by producing the fiber-reinforced resin-molded member provided with the exposed portion that is a connection target by the producing method of the first aspect of the present invention.

As described above, according to the method of producing the fiber-reinforced resin-molded member of the first aspect of the present invention, in the process of producing the fiber-reinforced resin-molded member to be connected, it is possible to form the exposed portion where the fiber-reinforcing material is exposed to the outside with high accuracy by a simple method. According to the method of connecting the members of the second aspect and the third aspect of the present invention, it is possible to efficiently connect at least two resin-molded members (connection between two fiber-reinforced resin-molded members, connection between a fiber-reinforced resin-molded member and a predetermined resin-molded member, etc.) to each other at an inexpensive production cost. At the time of connecting the fiber-reinforced resin-molded member and the different resin-molded member, these members are connected at the exposed portions included in the fiber-reinforced resin-molded member, or the fiber-reinforced resin-molded member is connected to the predetermined resin-molded member at the exposed portion included in the fiber-reinforced resin-molded member, thereby forming the connected portion to contain the fiber-reinforcing material of the exposed portion. Accordingly, it is possible to connect the two resin-molded members with high connecting strength.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIG. 4 is a drawing showing a part of a third step and a produced fiber-reinforced resin-molded member;

DETAILED DESCRIPTION OF EMBODIMENTS

Figure 1:
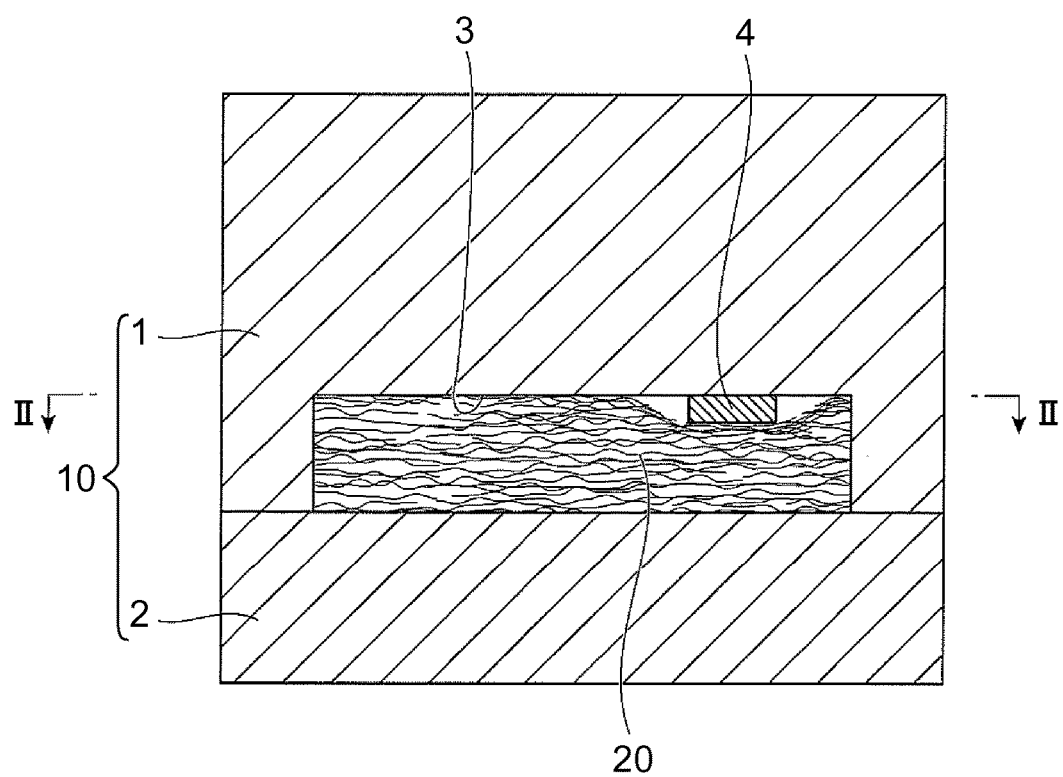
FIG. 1 is a drawing showing a first step and a part of a second step of a method of producing a fiber-reinforced resin-molded member of a first embodiment of the present invention.

A method of producing a fiber-reinforced resin-molded member of a first embodiment of the present invention and a method of connecting members will be described with reference to drawings hereinafter. A fiber-reinforced resin-molded member or a resin-molded member, i.e. a different member, exemplified in the drawings has a planar shape, and thus a connected portion thereof also has a planar shape, but these members and the connected portion may have a three-dimensional shape, such as a curved shape and a wavy shape. In the illustrated examples, a projecting portion is formed with a core disposed on a cavity surface of an upper mold, but the projecting portion may be integrated with a cavity surface of the upper mold or a lower mold. The number of the projecting portions, and the position and the planar shape of the projecting portion are not limited to the illustrated examples.

Figure 3:
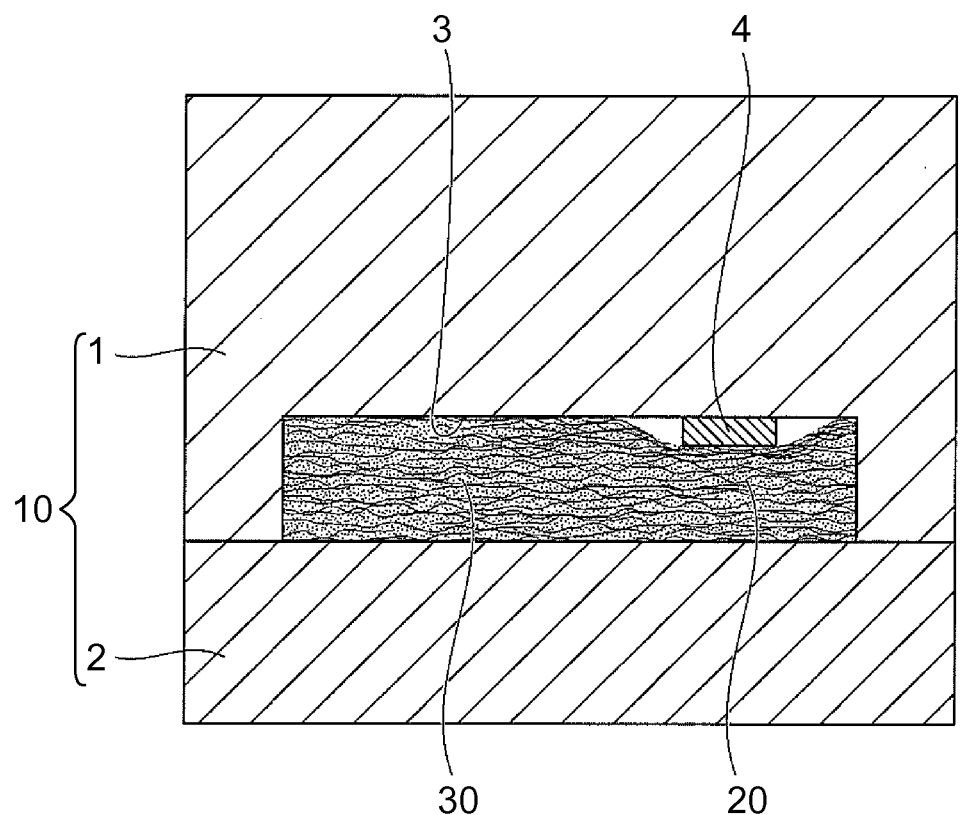
FIG. 3 is a drawing showing a part of the second step continued from FIG. 1.

FIG. 1 is a drawing showing a first step and a second step of the method of producing the fiber-reinforced resin-molded member of the first embodiment of the present invention. FIG. 3 is a drawing showing the second step continued from FIG. 1. FIG. 4 is a drawing showing a third step as well as a produced fiber-reinforced resin-molded member.

As shown in FIG. 1, there is prepared a mold 10 that includes: an upper mold 1 and a lower mold 2 by both of which a cavity 3 is formed (first step).

The mold 10 is opened, a fiber-reinforcing material 20 is disposed in the cavity 3, a projecting portion 4 formed of a core in a block shape is placed at a desired position of the fiber-reinforcing material 20, and the mold 10 is then closed.

The projecting portion 4 may be bonded at a predetermined position of the cavity surface of the upper mold 1. The illustrated example shows a case in which a single projecting portion 4 is used, but a plurality of projecting portions 4 may be used at plural predetermined positions. The illustrated projecting portion 4 has a rectangular planer shape, but any shape, such as a square and a circle, may be selected, and the plane area of the projecting portion 4 may be set depending on the number of the projecting portions 4 and connecting strength required for a connected portion between the two members.

The fiber-reinforcing material 20 to be disposed in the cavity 3 may be any of a continuous-fiber-reinforcing material, a long-fiber-reinforcing material, and a short fiber-reinforcing material, and it may be preferable to employ a continuous-fiber-reinforcing material having a fiber length of 50 mm or more, or a long-fiber-reinforcing material having a fiber length of less than 50 mm, for example, more than 10 mm to approximately 30 mm or less so as to produce a high-strength member.

Figure 2:
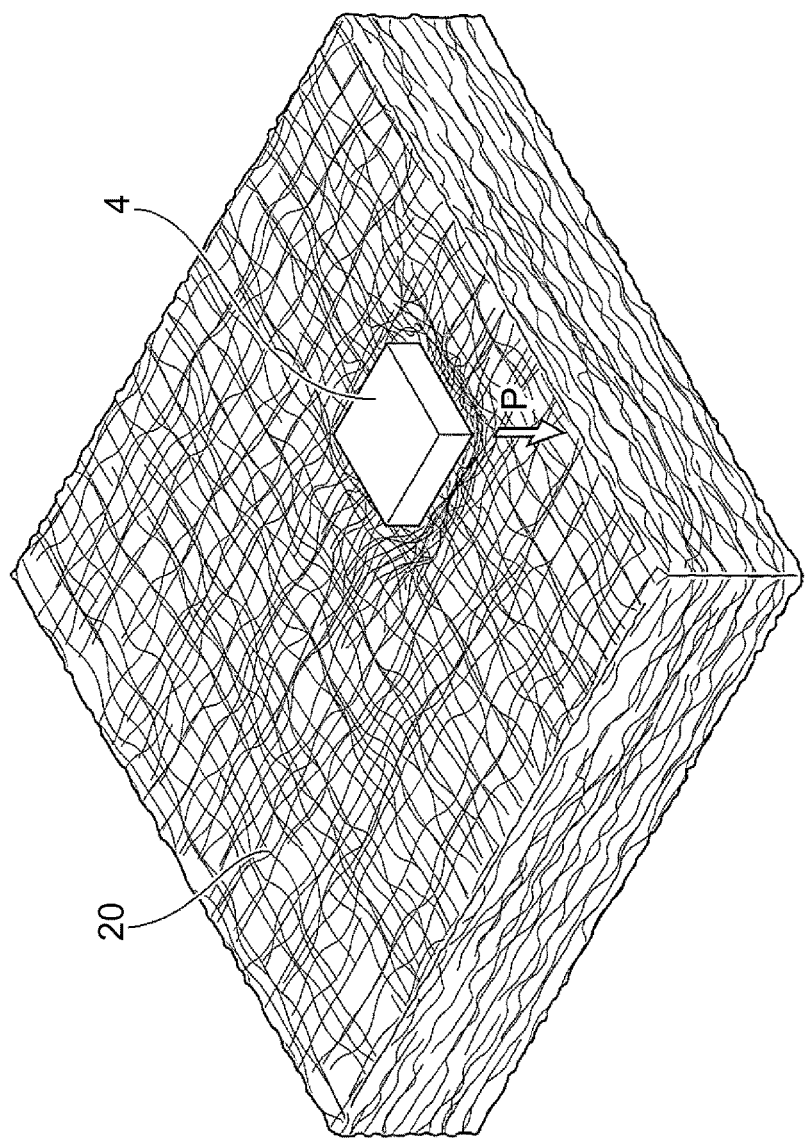
FIG. 2 is a view taken in line II-II of FIG. 1.

As shown in FIG. 2, the fiber-reinforcing material 20 is formed by collecting continuous reinforcing fibers and others into a shape and a dimension approximate to a shape and a dimension of the cavity 3, and an example of a raw material of the fiber-reinforcing material 20 may include any one of, or a mixture of two or more of ceramic fibers made of boron, alumina, silicon carbide, silicon nitride, zirconia, or the like; inorganic fibers such as glass fibers and carbon fibers; metallic fibers made of copper, steel, aluminum, stainless steel, or the like; and organic fibers made of polyamide, polyester, or the like.

The fiber-reinforcing material 20 is disposed in the cavity 3 of the mold 10, and the upper mold 1 and the lower mold 2 are closed, thereby generating a state in which the projecting portion 4 presses a predetermined portion of the fiber-reinforcing material 20, as shown in FIG. 1 and FIG. 2.

As shown in FIG. 2, when the predetermined portion of the fiber-reinforcing material 20 is downwardly pressed by the projecting portion 4 with a pressing force P, not only the portion directly pressed by the projecting portion 4 but also a peripheral region thereof are deformed downward.

While the predetermined portion of the fiber-reinforcing material 20 is maintained to be pressed by the projecting portion 4 in the cavity 3, the cavity 3 is filled with a melted resin 30, as shown in FIG. 3.

As a raw material of the melted resin 30, any of a thermoplastic resin and a thermosetting resin may be used; and as the thermoplastic resin, it is possible to employ any one of, or a material including a mixture of two or more of a crystalline plastic such as polyethylene (PE), polypropylene (PP), polyamide (PA: nylon 6, nylon 66, etc.), polyacetal (POM), and polyethylene terephthalate (PET); and an amorphous plastic such as polystyrene (PS), polyvinyl chloride (PVC), polymethylmethacrylate (PMMA), ABS resin, and thermoplastic epoxy resin. An example of the thermosetting resin may include an epoxy resin, a phenol resin, and an unsaturated polyester-based resin or the like.

The melted resin 30 supplied in the cavity 3 permeates the fiber-reinforcing material 20 to spread across the entire cavity 3, but hardly permeates a portion of the fiber-reinforcing material 20 directly pressed by the projecting portion 4 and peripheral portions thereof (portions that are not directly pressed but deformed due to influence from the directly pressed portion).

The melted resin 30 supplied in the cavity 3 is cured (the above is the second step), and subsequently, the mold 10 is opened for the mold releasing so as to produce a fiber-reinforced resin-molded member 40 (third step) as shown in FIG. 4. As shown in FIG. 4, in the produced fiber-reinforced resin-molded member 40, the fiber-reinforcing material 20 is basically embedded in the cured resin, but the portion pressed by the projecting portion 4 is compressively deformed; thus an exposed portion 40a that the melted resin does not permeate is formed, and the inner fiber-reinforcing material 20 is exposed to the outside in the exposed portion 40a.

As described above, in the illustrated method of producing the fiber-reinforced resin-molded member, the method is applied including impregnating the fiber-reinforcing material 20 with the melted resin 30 while pressing the desired position of the fiber-reinforcing material 20 by the projecting portion 4 formed of the core and others so as to produce the fiber-reinforced resin-molded member 40. Thus, it is possible to produce the fiber-reinforced resin-molded member 40 while forming the exposed portion 40a in which the inner fiber-reinforcing material 20 is exposed to the outside at the desired position of the fiber-reinforced resin-molded member 40 with high accuracy by a simple method.

Next, a method of connecting members according to the second embodiment of the present invention will be described with reference to FIG. 5A and FIG. 5B. The second embodiment is a method of connecting two members using the fiber-reinforced resin-molded members 40 as shown in FIG. 4. The steps shown in FIG. 5A and FIG. 5B are carried out in order.

Figure 5A:
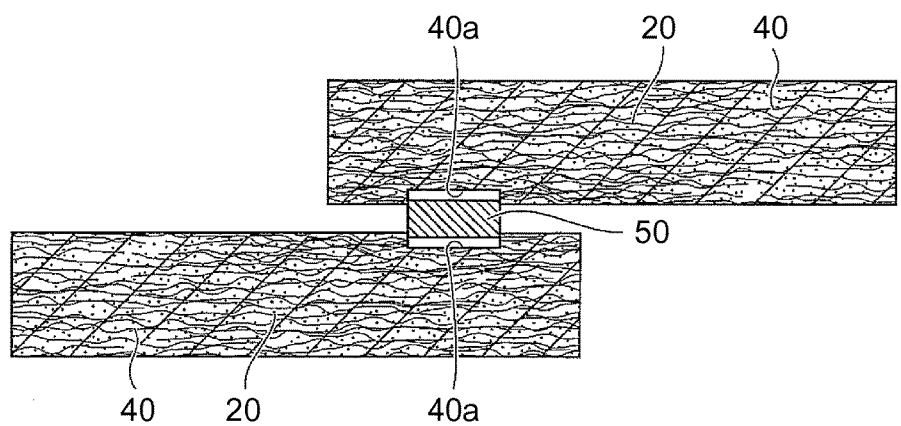
FIG. 5A and FIG. 5B are drawings showing a method of connecting members of a second embodiment of the present invention; and the method of connecting the members of the second embodiment of the present invention is carried out in the order of FIG. 5A and FIG. 5B.
Figure 5B:
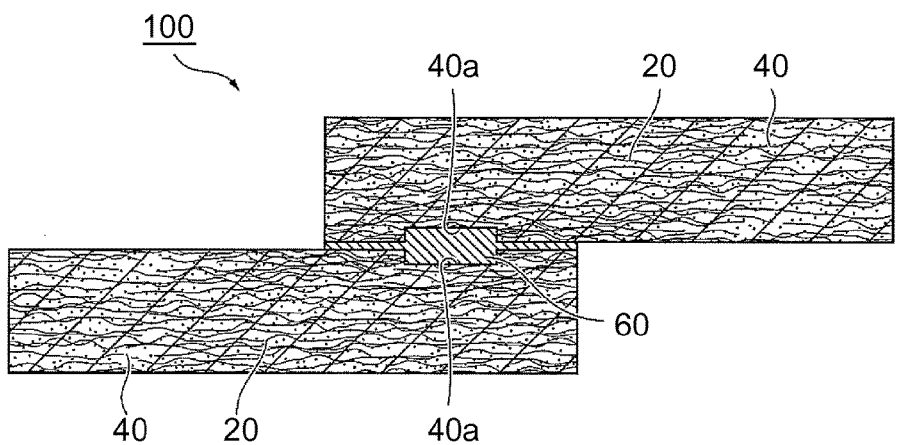

As shown in FIG. 5A, respective exposed portions 40a of the fiber-reinforced resin-molded members 40 are arranged to be opposite to each other, and a resin block 50 is disposed between the both exposed portions 40a. As a forming material of the resin block 50, it is preferable to use the same material as the material of the matrix resin of the fiber-reinforced resin-molded member 40 for preferable familiarity thereto.

The resin block 50 and a periphery thereof are so heated as to be melted, and the melted resin permeates the both exposed portions 40a, and is also flown through an interface between the fiber-reinforced resin-molded members 40 opposite to each other. The melted resin having flown through the interface between the fiber-reinforced resin-molded members 40 becomes cured, thus connecting the two fiber-reinforced resin-molded members 40 at an interface connected layer 60 formed through curing of the melted resin, thereby producing a connected structural body 100, as shown in FIG. 5B.

According to the illustrated method of connecting the members, since no connecting components such as adhesive and bolts are used, the two fiber-reinforced resin-molded members 40 can be efficiently connected to each other at an inexpensive production cost. When connecting the two fiber-reinforced resin-molded members 40, the fiber-reinforced resin-molded members 40 are connected at the respective exposed portions 40a included in the fiber-reinforced resin-molded members 40, thereby forming the connected portion to contain the fiber-reinforcing material 20 located at the exposed portions 40a; therefore, it is possible to connect the two fiber-reinforced resin-molded members 40 with high connecting strength.

Figure 6A:
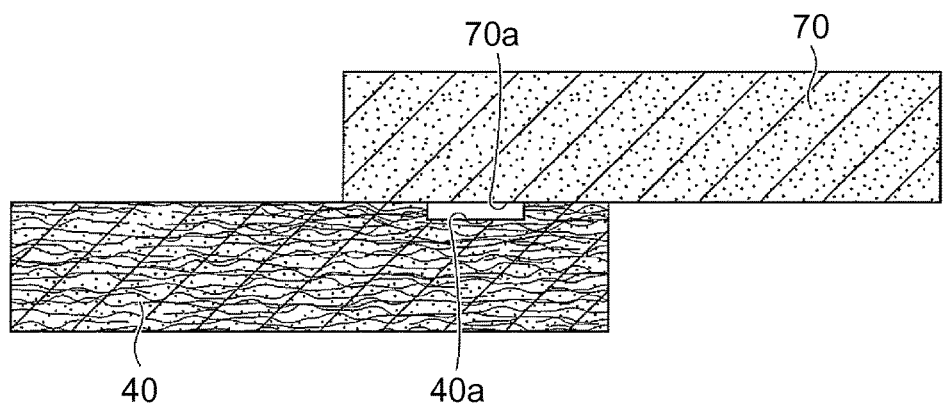
FIG. 6A and FIG. 6B are drawings showing a method of connecting members of a third embodiment of the present invention; and the method of connecting the members of the third embodiment of the present invention is carried out in the order of FIG. 6A and FIG. 6B.
Figure 6B:
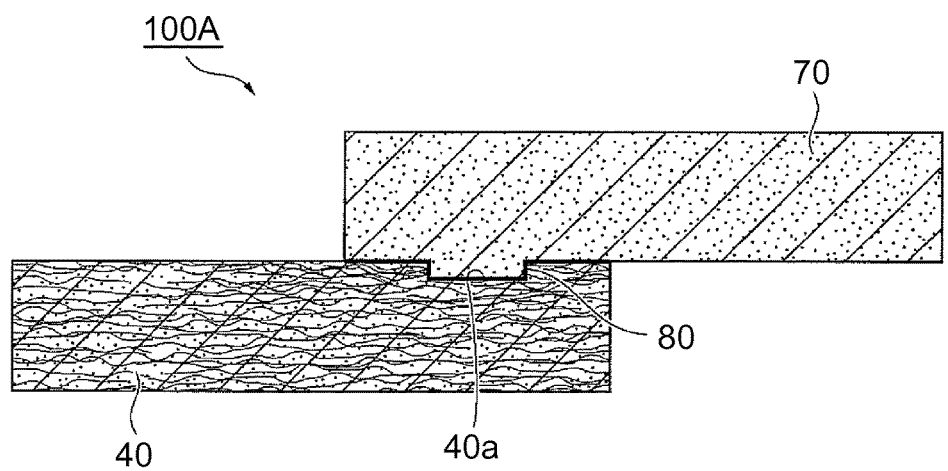

FIG. 6A and FIG. 6B are drawings showing the third embodiment of the method of connecting the members according to the present invention carried out in the order of FIG. 6A and FIG. 6B.

The connecting method of the third embodiment is a method of preparing the fiber-reinforced resin-molded member 40 and a different resin-molded member 70 including no exposed portion, and connecting the member 40 and the member 70 to each other. As shown in FIG. 6A, a part of the different resin-molded member 70 is so disposed to be opposite to the exposed portion 40a of the fiber-reinforced resin-molded member 40, and subsequently, the opposite portion 70a and a periphery thereof are heated.

By heating the opposite portion 70a and the periphery thereof, the resin located at this position becomes melted, and the melted resin permeates the exposed portion 40a, and is then flown through an interface between the fiber-reinforced resin-molded member 40 and the different resin-molded member 70 that are opposite to each other. The melted resin having flown through the interface between the fiber-reinforced resin-molded member 40 and the different resin-molded member 70 becomes cured, thus connecting the fiber-reinforced resin-molded member 40 and the different resin-molded member 70 at an interface connected layer 80 formed through curing of the melted resin, thereby producing a connected structural body 100A.

By the illustrated method of connecting the members, because of using no connecting components such as adhesive and bolts, it is also possible to efficiently connect the fiber-reinforced resin-molded member 40 and the different resin-molded member 70 to each other at an inexpensive production cost. At the time of connecting the fiber-reinforced resin-molded member 40 and the different resin-molded member 70 to each other, because the fiber-reinforced resin-molded member 40 is provided with the exposed portion 40a where the fiber-reinforcing material 20 is exposed, the connected portion is formed to contain the fiber-reinforcing material 20 at the exposed portion 40a; therefore, it is possible to connect the fiber-reinforced resin-molded member 40 and the different resin-molded member 70 to each other with high connecting strength.

Example of the present invention will be described hereinafter. A mold including a cavity for forming a flat plate having a plate thickness of 2 mm was used, and a core was joined at a predetermined position of a cavity surface of the mold. Plain-woven carbon fiber fabric of 400 g/m$^2$ was disposed in this mold, and then the mold was closed. A temperature of the mold was set at 160° C. As the thermoplastic resin to be supplied in the cavity, a mixture formed by adding a catalyst and an activator to ε-caprolactam that is a raw material of polyamide was used. The thermoplastic resin was melted at 100° C., and the mold was filled with the melted thermoplastic resin. After being held for ten minutes to polymerize the thermoplastic resin, the mold was opened to release a molded member therefrom. The produced molded member was observed, and it was found that an exposed portion where inner carbon fibers were exposed was formed at a portion where the plain-woven carbon fiber fabric had been pressed by the core. There were prepared two molded members produced in the above manner, and the respective exposed portions thereof were joined to each other through melting and curing of a thermoplastic resin made of the same material, thereby firmly connecting the both molded members to each other.

As described above, the embodiments of the present invention have been described in details with reference to the drawings, but specific configurations of the present invention are not limited to the above embodiments. The embodiments of the present invention may be appropriately changed without departing from the scope of the present invention.

What is claimed is:

1. A method of producing a fiber-reinforced resin-molded member, the method comprising:
   providing a mold including an upper mold and a lower mold by both of which a cavity is formed, a cavity surface of the upper mold or a cavity surface of the lower mold facing the cavity and being provided with a projecting portion;
   disposing a fiber-reinforcing material in the cavity;
   closing the upper mold and the lower mold to generate a state in which the projecting portion directly presses a portion of the fiber-reinforcing material, in turn compressively deforming each of the directly pressed portion and peripheral fiber-reinforcing material portions of the directly pressed portion;
   filling the cavity with a melted resin to impregnate the fiber-reinforcing material with the melted resin, the impregnated resin hardly permeating each of the deformed portion of the fiber-reinforcing material directly pressed by the projecting portion and the deformed peripheral portions of the directly pressed portion;
   curing the impregnated resin to form the fiber-reinforced resin-molded member; and
   opening the upper mold and the lower mold to obtain the fiber-reinforced resin-molded member, the fiber-reinforced resin-molded member having an exposed portion where the fiber-reinforcing material is exposed to an outside of the cured resin and a portion where the fiber-reinforcing material is embedded in the cured resin, and the exposed portion including at least the directly pressed portion.

2. The method of producing a fiber-reinforced resin-molded member according to claim 1, wherein the projecting portion includes a core disposed on the cavity surface.

3. A method of connecting members, the method comprising:
   producing a first fiber-reinforced resin-molded member and a second fiber-reinforced resin-molded member each by the method according to claim 1;
   disposing the exposed portion of the first fiber-reinforced resin-molded member opposite to the exposed portion of the second fiber-reinforced resin-molded member; and
   connecting the first fiber-reinforced resin-molded member and the second fiber-reinforced resin-molded member to each other by curing a melted resin at least between the oppositely disposed exposed portions of the first and second fiber-reinforced resin-molded members.

4. A method of connecting members, the method comprising:
   producing a fiber-reinforced resin-molded member by the method according to claim 1;
   disposing the exposed portion of the fiber-reinforced resin-molded member to be opposite to a predetermined resin-molded member;

heating and melting a resin of the predetermined resin-molded member in a portion of the predetermined resin-molded member opposite to the exposed portion;

impregnating the exposed portion with the melted resin of the opposite portion of the predetermined resin-molded member; and curing the resin of the opposite portion which has impregnated the exposed portion so as to connect the fiber-reinforced resin-molded member and the predetermined resin-molded member to each other.

* * * * *